No. 653,739. Patented July 17, 1900.
W. M. JEWELL.
PROCESS OF PURIFYING WATER.
(Application filed May 15, 1891.)
(No Model.)

Witnesses
Omar H. Jewell
Charles Lane

Inventor
William M. Jewell.

UNITED STATES PATENT OFFICE.

WILLIAM M. JEWELL, OF CHICAGO, ILLINOIS.

PROCESS OF PURIFYING WATER.

SPECIFICATION forming part of Letters Patent No. 653,739, dated July 17, 1900.

Application filed May 15, 1891. Serial No. 392,917. (No specimens.)

*To all whom it may concern:*

Be it known that I, WILLIAM M. JEWELL, a citizen of the United States, residing at Chicago, in the county of Cook and State of Illinois, have invented a certain new and Improved Process of Purifying Water, of which the following is a specification, reference being had to the accompanying drawings, in which—

Figure 1:
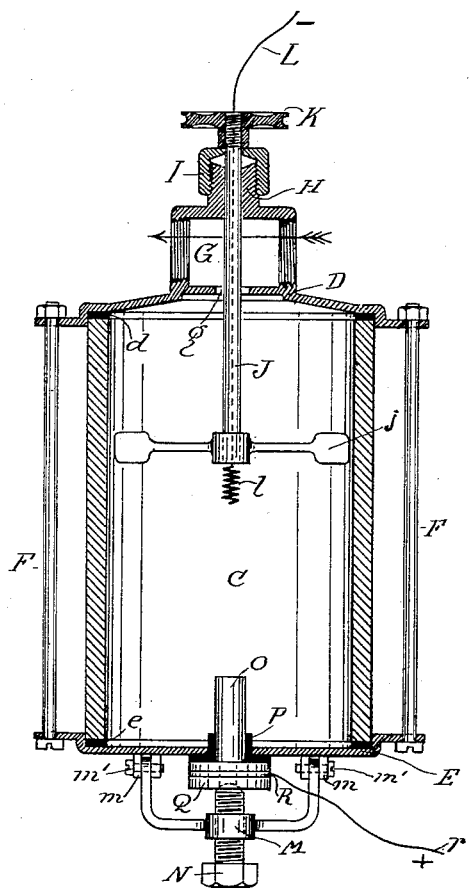
Figure 2:
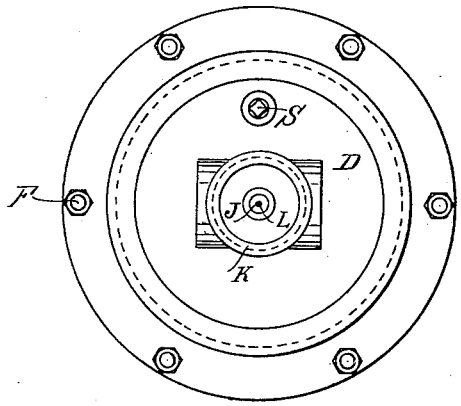

Figure 1 represents a vertical section on line A B of Fig. 2, and Fig. 2 is a top or plan view.

The object of my invention is to provide an improved process of purifying waters by coagulating and removing the impurities contained in them without the addition to the waters of deleterious soluble reagents, the use of the latter being objectionable for the reason that an excess of them may easily be added to the waters without physical detection, thereby in most cases rendering them unfit for potable purposes.

To this end my invention consists in electrolyzing a solution of a suitable salt in which is immersed an anode composed of a substance adapted to be chemically acted upon by one or more of the constituents of the solution separated by the electrolytical decomposition to ultimately form a substantially-insoluble coagulant, introducing the freshly-formed coagulant into the water to be purified, and then filtering the water in the presence of such coagulant. The electrolyte is placed in a chamber separate from the conduit or chamber containing the water to be treated, but communicating therewith, the reaction between the products of the electrolytic action taking place in the chamber where they are produced, so that only the insoluble coagulant is introduced into the water to be purified, thus avoiding contamination.

More specifically, my invention consists in forming hydrate of iron by electrolyzing a solution of sodium chlorid or its equivalent in the presence of an iron anode, the immediate products of the electrolysis being permitted to react upon each other, and afterward filtering the water to be purified in the presence of the hydrate of iron.

The accompanying drawings illustrate a form of electrolytic apparatus well adapted to carry out my improved process so far as concerns the production of the coagulant and its introduction into the water to be purified; but other suitable apparatus may be employed.

Referring to the drawings for a description of the apparatus therein illustrated, C represents a cylinder, preferably of glass, which is securely held between two brass caps D E by means of rods F, suitable soft gaskets d e being inserted between the cylinder and caps to secure a water-tight joint. The cap D, which preferably tapers slightly on the inside, as shown, has a hollow threaded dome G on its upper side, forming a through-passage over the cylinder C, as indicated by the arrow in Fig. 1. An opening g is provided to allow communication between the interior of said dome and the cylinder C.

J indicates a vertical shaft which passes through the dome G into the cylinder C, as shown in Fig. 1. A stuffing-box H and gland I are provided at the top of the dome G around the shaft J. A pulley K is provided at the top of the shaft J, whereby the shaft may be rotated by any suitable gearing. The shaft J is supported by the pulley K, which is either soldered, keyed, or screwed on the upper end of said shaft, the pulley resting upon the gland I.

Upon the lower end of the shaft J are mounted two vanes j, which are keyed to said shaft. When the cylinder C is filled with the proper solution to a point above the vanes j and the shaft J is rotated, the vanes will serve to thoroughly agitate the liquid in the cylinder.

L indicates a wire which passes through the shaft J, which is hollow, which wire is thoroughly insulated from the shaft. The wire is preferably of platinum and is provided on its lower end with an uninsulated coil l, so that a large surface of uninsulated wire may be exposed below the end of the shaft.

S indicates an opening in the cap D, through which the solution may be introduced into the cylinder C. The opening S may be closed by a plug or in any other suitable manner when not in use.

The lower cap E is provided with two pairs of lugs m, to which is secured a swinging yoke M by pins m'. By this construction the yoke may swing to one side for purposes which will appear hereinafter. The cap E is also provided at its center with a hole, through which a piece of iron or steel O may be inserted in such manner as to project into the center of the cylinder, as shown in Fig. 1. The yoke M is provided at its center with a hole adapted to receive a binding-screw N, which serves to bind the iron O against a suitable gasket and insulator P to form a water-tight contact, and the iron O is preferably provided with a collar at its base to better adapt it for such contact. The iron O is insulated from the screw N by means of a plate Q, of gutta-percha or other suitable material, as shown in Fig. 1, and a sheet of metal R, preferably of copper, is placed between the gutta-percha Q and the piece of iron O, to which plate R is connected a wire $r$. I prefer to use a copper plate R to form a contact with the piece of iron O, as better contact is thereby secured; but the wire $r$ may be secured directly to the iron O, if desired.

In placing the iron O in position the yoke M is turned to one side and the iron O is inserted in the hole in the cap E. After the gaskets and insulating-plates have been placed in position the yoke is turned until the screw N is opposite the end of the plate Q, when by screwing the screw N against the plate Q the parts are held tightly in place. The lower cap E is also provided with a drain-cock (not shown) for emptying the cylinder C when desired.

In the treatment of water by my improved process the cylinder C would be filled to a point a little above the vanes $j$ with a saturated solution of common salt, thus immersing the two electrodes $l$ and O in the solution. The water to be treated is fed by suitable pipe connections through the passage in the dome G, and thus is made to pass directly over the solution in the cylinder C, but is prevented from mixing with it to any great extent by the construction of the cap D. A sufficient amount of water, however, to fill the cylinder C above the salt solution will pass into the cylinder through the opening $g$, and as the water to be filtered flows through the passage in the dome G a slight current will be caused to flow into and out of the cylinder C. The electrodes $l$ and O are now connected by their wires L and $r$ to the negative and positive poles, respectively, of any suitable electrical generator, and the well-known action of electrolysis will take place, the reaction being as follows: Sodium chlorid is decomposed by the action of the electric current into its constituent elements—sodium and chlorin, the latter going to the positive or iron electrode O, with which it combines, forming ferrous chlorid, ($FeCl_2$,) which being soluble is dissolved by the solution in the cylinder C. At the same time the sodium liberated will decompose the water and form sodium hydrate, ($NaHO$,) a molecule of free hydrogen being liberated. As both the sodium hydrate and the ferrous chlorid are soluble in water, they will be thoroughly intermingled by the rotating vanes $j$, which are driven by any suitable motive power applied to the pulley K, as above described, the consequence being that the sodium hydrate will act upon the ferrous chlorid, precipitating ferrous hydrate, $Fe(HO)_2$, sodium chlorid being also formed and remaining in solution, $FeCl_2+2NaHO=2NaCl+Fe(HO)_2$. The sodium chlorid thus formed may be again decomposed, as before, in subsequent reactions, and the ferrous hydrate, which is insoluble in water, will be precipitated as a dark-green spongy flocculent precipitate. This precipitate, being lighter than the solution, will rise, and by the action of the water flowing through the passage in the dome G it will finally pass through the opening $g$ and will mix with the current of impure water, when it will act, as hereinbefore indicated, to precipitate the suspended impurities.

In the improved process herein described the only reagent introduced into the impure water is the insoluble ferrous hydrate, which can have no vitiating effect upon the water. If, however, it happens that a small amount of sodium chlorid from the cylinder C should pass into the current flowing through the dome G, it would have no bad effect upon the water, as the quantity would be very small. The impurities precipitated from the unfiltered water by the ferrous hydrate are removed by the usual filtering apparatus.

I am aware that electricity has been used in various ways in connection with purifying waters; but in all cases that I know of its action has been directly upon the water to be purified instead of being used as an agent to produce a reagent designed to act upon the water.

The essential feature of my invention consists in electrolyzing a suitable solution in a separate chamber in the presence of a substance capable of reacting with one or more of the separated constituents of the electrolyte to ultimately form a substantially-insoluble coagulant, introducing the freshly-formed coagulant into the water to be purified, and filtering it in the presence of such coagulant.

I do not limit myself to the use of an anode composed of iron or to sodium chlorid as the electrolyte, except in so far as such elements are specifically claimed, since with certain waters it may be desirable to use a different coagulant, in which case the anode or the electrolyte, or both, would have to be of other composition in order to form the desired coagulant.

That which I claim as new, and desire to secure by Letters Patent, is—

1. A process of purifying water consisting in continuously decomposing a solution of a suitable salt by electrolysis in a separate chamber, in the presence of a substance capable of reacting with one or more of the separated constituents of the electrolyte to ultimately form a substantially-insoluble coagulant, introducing the coagulant as formed into the water to be purified and filtering the water in the presence of said coagulant, substantially as described.

2. A process of purifying water consisting in continuously forming ferrous hydrate by electrolysis of a solution of a suitable salt in a separate chamber, introducing it as formed into the water to be purified, and then filtering the water, substantially as described.

3. A process of purifying water which consists in continuously producing an insoluble flocculent reagent by electrolysis of a solution of a suitable salt in a separate chamber, then introducing such reagent as formed into the impure water, and then filtering the water, substantially as described.

4. A process of purifying water which consists in continuously decomposing a solution of a suitable salt by electrolysis in a separate chamber in the presence of a substance capable of combining with certain of the separated constituents of the electrolyte, thereby producing soluble compounds which react upon each other to form a substantially-insoluble purifying reagent and a soluble salt, introducing such reagent as formed into the water to be purified, and then filtering the water, substantially as described.

5. The process of purifying liquids, which consists in continuously forming ferrous hydrate, in a separate chamber, by electrically decomposing a solution of sodium chlorid in the presence of an iron anode, afterward introducing the ferrous hydrate as formed into the liquid to be purified, and filtering said liquid, substantially as described.

6. The process of purifying water, which consists in continuously forming a suitable purifying reagent by electrolyzing a solution of a suitable salt in which is immersed an anode composed of a substance adapted to combine with one or more of the constituents separated by the electrolytical decomposition, forming a new chemical combination from the soluble salts thus obtained, which combination constitutes an insoluble purifying reagent, afterward introducing the reagent as formed into the water to be purified, and then filtering the liquid, substantially as described.

WILLIAM M. JEWELL.

Witnesses:
CHARLES LANE,
IRA H. JEWELL.